US012118968B2

(12) United States Patent
Susami et al.

(10) Patent No.: US 12,118,968 B2
(45) Date of Patent: Oct. 15, 2024

(54) NON-TRANSITORY COMPUTER-READABLE STORAGE MEDIUM STORED WITH AUTOMATIC MUSIC ARRANGEMENT PROGRAM, AND AUTOMATIC MUSIC ARRANGEMENT DEVICE

(71) Applicant: Roland Corporation, Shizuoka (JP)

(72) Inventors: Ryo Susami, Shizuoka (JP); Tomoko Ito, Shizuoka (JP)

(73) Assignee: Roland Corporation, Shizuoka (JP)

(*) Notice: Subject to any disclaimer, the term of this patent is extended or adjusted under 35 U.S.C. 154(b) by 720 days.

(21) Appl. No.: 17/361,325

(22) Filed: Jun. 29, 2021

(65) Prior Publication Data

US 2021/0407476 A1 Dec. 30, 2021

(30) Foreign Application Priority Data

Jun. 30, 2020 (JP) ................................ 2020-112612

(51) Int. Cl.
*G10H 1/00* (2006.01)

(52) U.S. Cl.
CPC ..... *G10H 1/0025* (2013.01); *G10H 2210/056* (2013.01); *G10H 2210/061* (2013.01); *G10H 2210/066* (2013.01); *G10H 2210/111* (2013.01); *G10H 2210/571* (2013.01)

(58) Field of Classification Search
CPC ........... G10H 1/0025; G10H 2210/056; G10H 2210/061; G10H 2210/066; G10H 2210/111; G10H 2210/571
See application file for complete search history.

(56) References Cited

U.S. PATENT DOCUMENTS

| | | | |
|---|---|---|---|
| 5,418,325 | A | 5/1995 | Aoki et al. |
| 5,561,256 | A | 10/1996 | Aoki et al. |
| 5,756,916 | A | 5/1998 | Aoki et al. |

(Continued)

FOREIGN PATENT DOCUMENTS

| | | |
|---|---|---|
| JP | H0636151 | 5/1994 |
| JP | 2002202776 | 7/2002 |

(Continued)

OTHER PUBLICATIONS

"Office Action of Japan Counterpart Application", issued on Jan. 16, 2024, with English translation thereof, pp. 1-9.

*Primary Examiner* — Jianchun Qin
(74) *Attorney, Agent, or Firm* — JCIPRNET

(57) ABSTRACT

A non-transitory computer-readable storage medium stored with an automatic music arrangement program, and an automatic music arrangement device are provided. An outer voice note having a highest pitch among notes of which sound production start times are approximately the same in a melody part acquired from musical piece data is identified. A melody part acquired by deleting inner voice notes of which sound production starts within a sound production period of the outer voice note and of which pitches are low from the melody part is generated. Candidate accompaniment parts in which root notes of chords of chord data of the musical piece data are arranged to be produced at sound production timings thereof for each pitch range acquired by shifting a range of pitches corresponding to one octave by one semitone at each time are generated, and an accompaniment part is selected among them.

21 Claims, 9 Drawing Sheets

(56) References Cited

U.S. PATENT DOCUMENTS

| | | | | |
|---|---|---|---|---|
| 7,351,903 | B2 | 4/2008 | Ishida et al. | |
| 10,354,628 | B2 | 7/2019 | Watanabe | |
| 2002/0007721 | A1* | 1/2002 | Aoki | G10H 1/20 84/613 |
| 2016/0148606 | A1* | 5/2016 | Minamitaka | G10H 1/38 84/609 |
| 2017/0084261 | A1* | 3/2017 | Watanabe | G10H 1/0025 |
| 2020/0302902 | A1* | 9/2020 | Vorobyev | G10H 1/0025 |

FOREIGN PATENT DOCUMENTS

| | | |
|---|---|---|
| JP | 2002258846 | 9/2002 |
| JP | 2008145564 | 6/2008 |
| JP | 009020323 | 1/2009 |
| JP | 2011118221 | 6/2011 |
| JP | 2017058596 | 3/2017 |

* cited by examiner (a)

Performance data 21b1、
Melody data 22a

| No | Note number | Start time (Tick) | Sound production time (Tick) |
|---|---|---|---|
| 1 | 72 (C) | 0 | 5 |
| 2 | 78 (G) | 0 | 10 |
| 3 | 77 (F) | 2 | 5 |
| 4 | 81 (A) | 5 | 15 |
| : | : | : | : |

(b)

Chord data 21b2
Input chord data 22b

| No | Chord | Start time (Tick) |
|---|---|---|
| 1 | C | 0 |
| 2 | F | 5 |
| 3 | G | 15 |
| 4 | C | 20 |
| : | : | : |

(a)

Candidate accompaniment table 22c

| No | Note number | Standard deviation S | Difference value D | Keyboard range W | Evaluation value E |
|---|---|---|---|---|---|
| 1 | 60 (C)<br>53 (F)<br>55 (G)<br>60 (C)<br>: | 4 | 4 | 7 | 4004007 |
| 2 | 48 (C)<br>53 (F)<br>55 (G)<br>43 (G)<br>: | 5 | 3. 25 | 8 | 5003258 |
| : | : | : | : | : | : |
| 12 | 48 (C)<br>41 (F)<br>43 (G)<br>48 (C)<br>: | 3 | 8 | 7 | 3008007 |

(b)

Output accompaniment data 22d

| No | Note number | Start time (Tick) |
|---|---|---|
| 1 | 60 (C) | 0 |
| 2 | 53 (F) | 5 |
| 3 | 55 (G) | 15 |
| 4 | 60 (C) | 20 |
| : | : | : |

(c)

FIG. 6

NON-TRANSITORY COMPUTER-READABLE STORAGE MEDIUM STORED WITH AUTOMATIC MUSIC ARRANGEMENT PROGRAM, AND AUTOMATIC MUSIC ARRANGEMENT DEVICE

CROSS-REFERENCE TO RELATED APPLICATION

This application claims the priority benefit of Japan application no. 2020-112612, filed on Jun. 30, 2020. The entirety of the above-mentioned patent application is hereby incorporated by reference herein and made a part of this specification.

BACKGROUND

Technical Field

The disclosure relates to a non-transitory computer-readable storage medium stored with an automatic music arrangement program and an automatic music arrangement device.

Description of Related Art

In Patent Document 1, an automatic music arrangement device that generates a new performance information file by identifying notes serving as chord component sounds of which production is started at the same time among notes included in a performance information file 24 and deleting notes exceeding a predetermined threshold among the identified notes in order of lowest to highest pitch is disclosed. In accordance with this, in the generated new performance information file, the number of chords that are generated at the same time is smaller than that in the performance information file 24, and thus a performer can easily perform the new performance information file.

Patent Documents

[Patent Document 1] Japanese Patent Laid-Open No. 2008-145564 (for example, Paragraph 0026)

SUMMARY

However, there are cases in which notes are recorded with sounds of multiple pitches that are not produced at the same time partly overlapping each other in a performance information file 24. When such a performance information file 24 is input to the automatic music arrangement device disclosed in Patent Document 1, production of notes of which multiple pitches partly overlap each other is not started at the same time and thus they are not recognized as chord component sounds. Thus, in such a case, the number of notes is not decreased, and the notes are output to a new performance information file as they are, and thus there is a problem in that a musical score that can be easily performed cannot be generated from the performance information file.

The disclosure provides an automatic music arrangement program and an automatic music arrangement device capable of generating arranged data, in which the number of sounds to be produced at the same time is decreased, and that can be easily performed from musical piece data.

According to an embodiment of the disclosure, there is provided a non-transitory computer-readable storage medium stored with an automatic music arrangement program causing a computer to execute a process of music arrangement of a musical piece data, the automatic music arrangement program causing the computer to execute: a musical piece acquiring step of acquiring the musical piece data; a melody acquiring step of acquiring notes of a melody part from the musical piece data acquired in the musical piece acquiring step; an outer voice identifying step of identifying a note having a highest pitch among notes of which start times of sound production are approximately the same as an outer voice note, among the notes acquired in the melody acquiring step; an inner voice identifying step of identifying a note of which sound production starts within a sound production period of the outer voice note identified in the outer voice identifying step and of which a pitch is lower than that of the outer voice note as an inner voice note, among the notes acquired in the melody acquiring step; an arranged melody generating step of generating an arranged melody part by deleting the inner voice note identified in the inner voice identifying step from the notes acquired in the melody acquiring step; and an arranged data generating step of generating an arranged data on a basis of the melody part generated in the arranged melody generating step.

According to another embodiment of the disclosure, there is provided a non-transitory computer-readable storage medium stored with an automatic music arrangement program causing a computer to execute a process of music arrangement of a musical piece data, the automatic music arrangement program causing the computer to execute: a musical piece acquiring step of acquiring the musical piece data; a chord information acquiring step of acquiring chords and sound production timings of the chords from the musical piece data acquired in the musical piece acquiring step; a note name acquiring step of acquiring note names of root notes of the chords acquired in the chord information acquiring step; a range changing step of changing a position in a pitch of a pitch range that is a predetermined range of pitches by one semitone each time; a candidate accompaniment generating step of generating candidate accompaniment parts that are candidates for an accompaniment part from sounds of pitches corresponding to the note names which are acquired in the acquiring of note names in the pitch range, and the sound production timings of the chords which are acquired in the chord information acquiring step corresponding to the sounds, for each pitch range changed in the range changing step; a selection step of selecting an arranged accompaniment part among the candidate accompaniment parts on a basis of the pitches of sounds included in the candidate accompaniment parts generated in the candidate accompaniment generating step; and an arranged data generating step of generating an arranged data on a basis of the accompaniment part selected in the selection step.

In addition, according to another embodiment of the disclosure, there is provided an automatic music arrangement device including: a musical piece acquiring portion, configured to acquire a musical piece data; a melody acquiring portion, configured to acquire notes of a melody part from the musical piece data acquired by the musical piece acquiring portion; an outer voice identifying portion, configured to identify a note having a highest pitch among notes of which start times of sound production are approximately the same as an outer voice note, among the notes acquired by the melody acquiring portion; an inner voice identifying portion, configured to identify a note of which sound production starts within a sound production period of the outer voice note identified by the outer voice identifying portion and of which a pitch is lower than that of the outer voice note as an inner voice note, among the notes acquired by the melody acquiring portion; an arranged melody generating portion, configured to generate an arranged melody part by deleting the inner voice note identified by the inner voice identifying portion from the notes acquired by the melody acquiring portion; and a arranged data generating portion, configured to generate an arranged data on a basis of the melody part generated by the arranged melody generating portion.

According to another embodiment of the disclosure, there is provided an automatic music arrangement device including: a musical piece acquiring portion, configured to acquire a musical piece data; a chord information acquiring portion, configured to acquire chords and sound production timings of the chords from the musical piece data acquired by the musical piece acquiring portion; a note name acquiring portion, configured to acquire note names of root notes of the chords acquired by the chord information acquiring portion; a range changing portion, configured to change a position in a pitch of a pitch range that is a predetermined range of pitches by one semitone each time; a candidate accompaniment generating portion, configured to generate candidate accompaniment parts that are candidates for an accompaniment part from sounds of pitches corresponding to the note names which are acquired by the note name acquiring portion in the pitch range, and the sound production timings of the chords which are acquired by the chord information acquiring portion corresponding to the sounds, for each pitch range changed by the range changing portion; a selection portion, configured to select the arranged accompaniment part among the candidate accompaniment parts on a basis of the pitches of sounds included in the candidate accompaniment parts generated by the candidate accompaniment generating portion; and a arranged data generating portion, configured to generate an arranged data on a basis of the accompaniment part selected by the selection portion.

BRIEF DESCRIPTION OF THE DRAWINGS

In FIG. 6, (a) is a diagram schematically illustrating chord data and input chord data, (b) is a diagram schematically illustrating a candidate accompaniment table, and (c) is a diagram schematically illustrating output accompaniment data.

DESCRIPTION OF THE EMBODIMENTS

Figure 1:
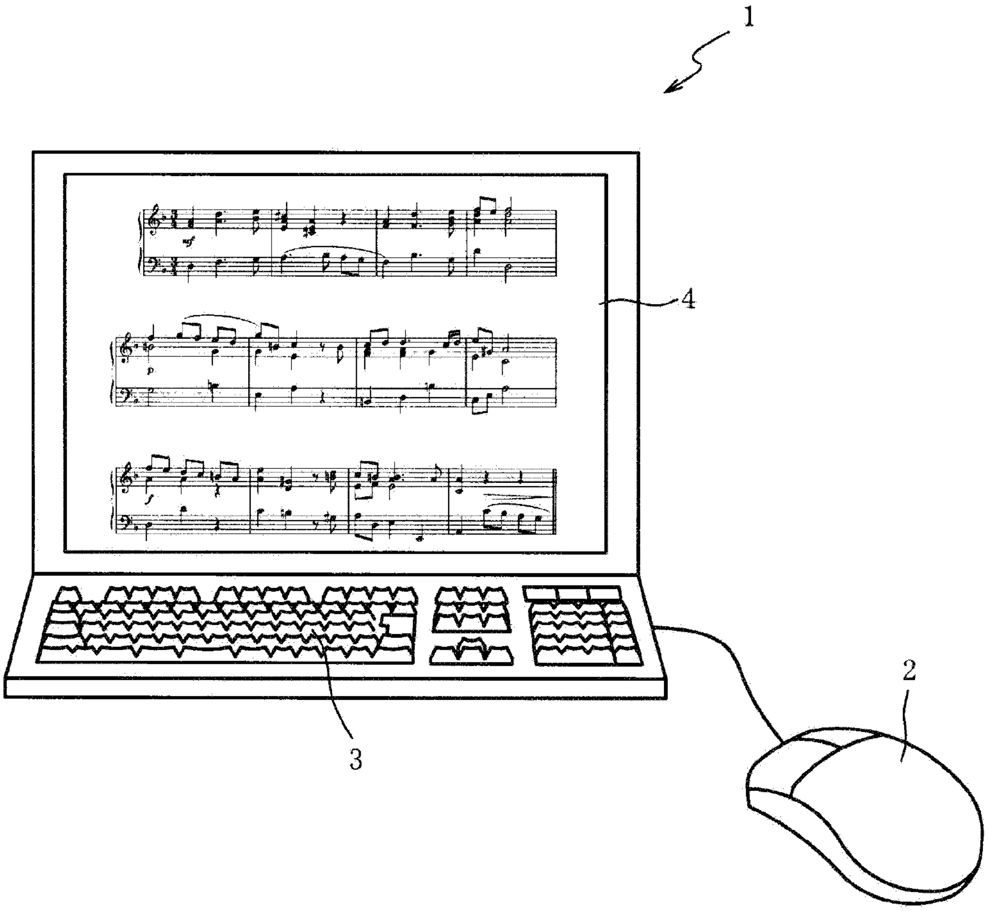
FIG. 1 is a diagram of an external view of a PC.

Hereinafter, a preferred embodiment will be described with reference to the accompanying drawings. An overview of a PC 1 according to this embodiment will be described with reference to FIG. 1. FIG. 1 is a diagram of an external view of a PC 1. The PC 1 is an information processing device (computer) that generates arranged data A having a form that can be easily performed by a user H who is a performer by decreasing the number of sounds that are produced at the same time in musical piece data M including performance data P to be described below. In the PC 1, a mouse 2 and a keyboard 3 through which the user H inputs instructions and a display device 4 that displays a musical score generated from the arranged data A and the like are disposed.

In the musical piece data M, performance data P in which performance information of a musical piece according to a musical instrument digital interface (MIDI) format is stored and chord data C in which chord progression in the musical piece is stored are provided. In this embodiment, a melody part Ma that is a main melody of a musical piece and is performed by a user H using his or her right hand is acquired from performance data P of musical piece data M, and an arranged melody part Mb acquired by decreasing the number of notes that are produced at the same time for the acquired melody part Ma is generated.

In addition, an arranged accompaniment part Bb that is an accompaniment sound of a musical piece and is performed by the user H using his or her left hand is generated from a root note of a chord and the like acquired from chord data C of the musical piece data M. Then, arranged data A is generated from these melody part Mb and accompaniment part Bb. First, a technique for generating the arranged melody part Mb will be described with reference to FIG. 2.

Figure 2:
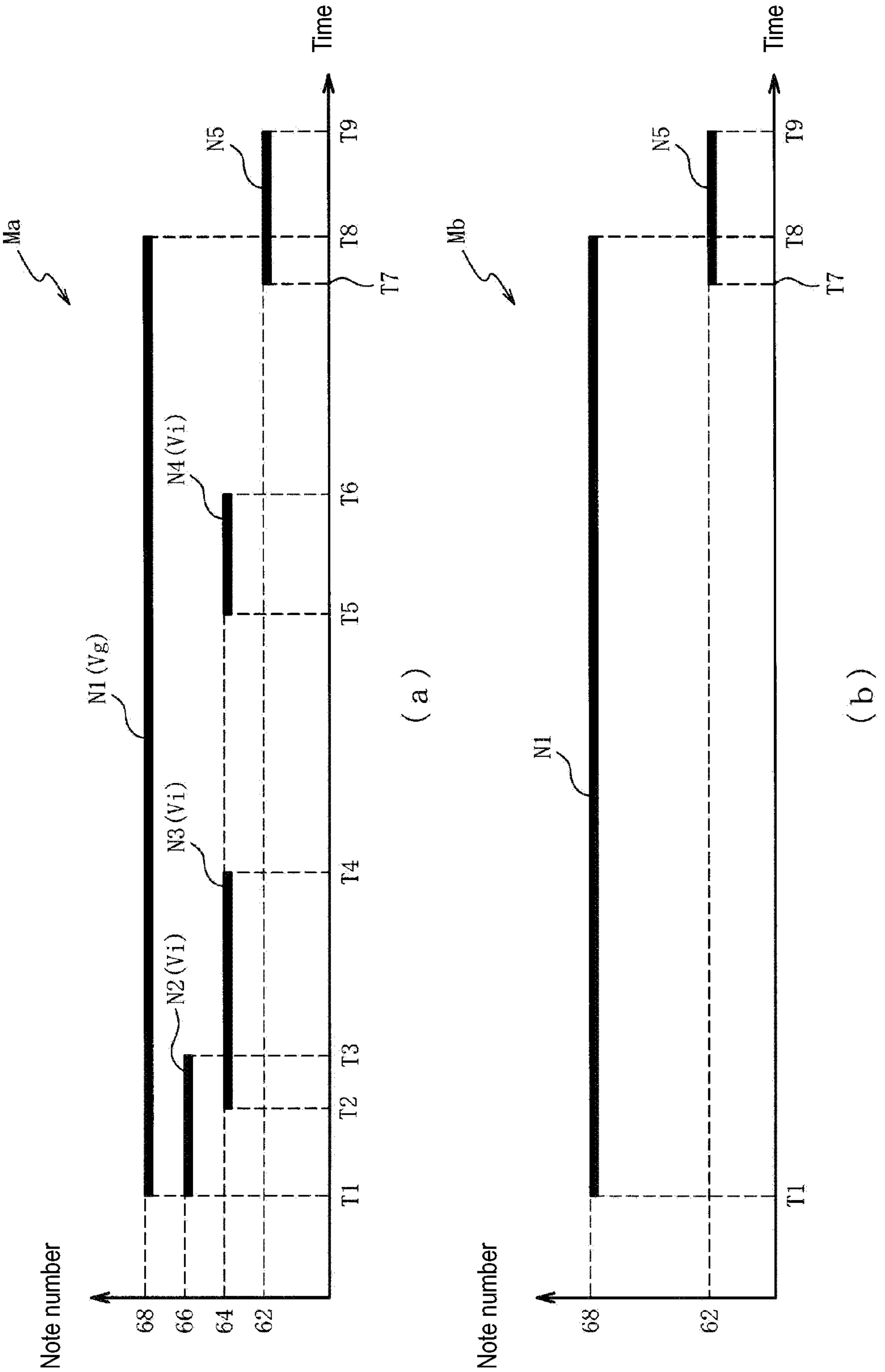
In FIG. 2, (a) is a diagram illustrating a melody part of musical piece data, and (b) is a diagram illustrating an arranged melody part.

In FIG. 2, (a) is a diagram illustrating a melody part Ma of musical piece data M, and (b) is a diagram illustrating an arranged melody part Mb. As illustrated in (a) of FIG. 2, in the melody part Ma of the musical piece data M, a note N1 that is produced with a note number 68 from time T1 to time T8, a note N2 that is produced with a note number 66 from time T1 to time T3, a note N3 that is produced with a note number 64 from time T2 to time T4, a note N4 that is produced with a note number 64 from time T5 to time T6, and a note N5 that is produced with a note number 62 from time T7 to time T9 are stored. In (a) and (b) of FIG. 2, the times T1 to T9 with smaller numbers represent earlier times.

In the melody part Ma, the note N1 having the highest pitch and a long sound production period starts to be produced together with the note N2, and, during the sound production of the note N1, stop of sound production of the note N2, start and stop of sound production of the notes N3 and N4, and start of sound production of the note N5 are performed. When a musical score is generated on the basis of such a melody part Ma, the notes N2 to N5 need to be produced during the sound production of the note N1, and it becomes difficult for a user H to perform the musical score.

In this embodiment, the number of sounds to be produced at the same time in such a melody part Ma is decreased. More specifically, first, notes of which sound production is started at the same time in the melody part Ma are acquired. In (a) of FIG. 2, the notes N1 and N2 correspond to notes of which production starts at the same timing, and thus the notes N1 and N2 are acquired.

Then, a note having the highest pitch among the acquired notes is identified as an outer voice note Vg, and a note having a pitch lower than that of the outer voice note Vg is identified as an inner voice note Vi. In (a) of FIG. 2, the note N1 having a higher pitch out of the notes N1 and N2 is identified as an outer voice note Vg, and the note N1 having a pitch lower than that of the note N1 is identified as an inner voice note Vi.

In addition, notes of which start of sound production and stop of sound production are performed within a sound production period of the note identified as the outer voice note Vg are acquired and are additionally identified as inner voice notes Vi. In (a) of FIG. 2, notes of which start of sound production and end of sound production are performed within the sound production period of the note N1 that is the outer voice note Vg are the notes N3 and N4, and thus these are also identified as inner voice notes Vi.

Then, by deleting the notes that are identified as inner voice notes Vi from the melody part Ma, an arranged melody part Mb is generated. In (b) of FIG. 2, by deleting the notes N2 to N4 identified as the inner voice notes Vi from the notes N1 to N5 of the melody part Ma, an arranged melody part Mb according to the notes N1 and N5 is generated.

In accordance with this, in the arranged melody part Mb, the notes N2 to N4 of which sound production is started and stopped within the sound production period of the note N1 are deleted from among sounds that are produced at the same time with the note N1 that is the outer voice note Vg, and thus the number of sounds that are produced at the same time in the entire melody part Mb can be decreased. In addition, the outer voice note Vg included in the melody part Mb is regarded as a sound of which a pitch is high and is heard conspicuously by a listener in the melody part Ma of the musical piece data M. In accordance with this, the arranged melody part Mb can be formed as a melody part that is maintained like the melody part Ma of the musical piece data M.

Here, production of the note N5 that is recorded in the arranged melody part Mb together with the note N1 starts within the sound production period of the note N1 and stops after production of the note N1 stops. In accordance with such notes remaining in the arranged melody part Mb, the melody part Mb maintaining a tune that is a change in the pitch of the melody part Ma of the musical piece data M can be formed.

Figure 3:
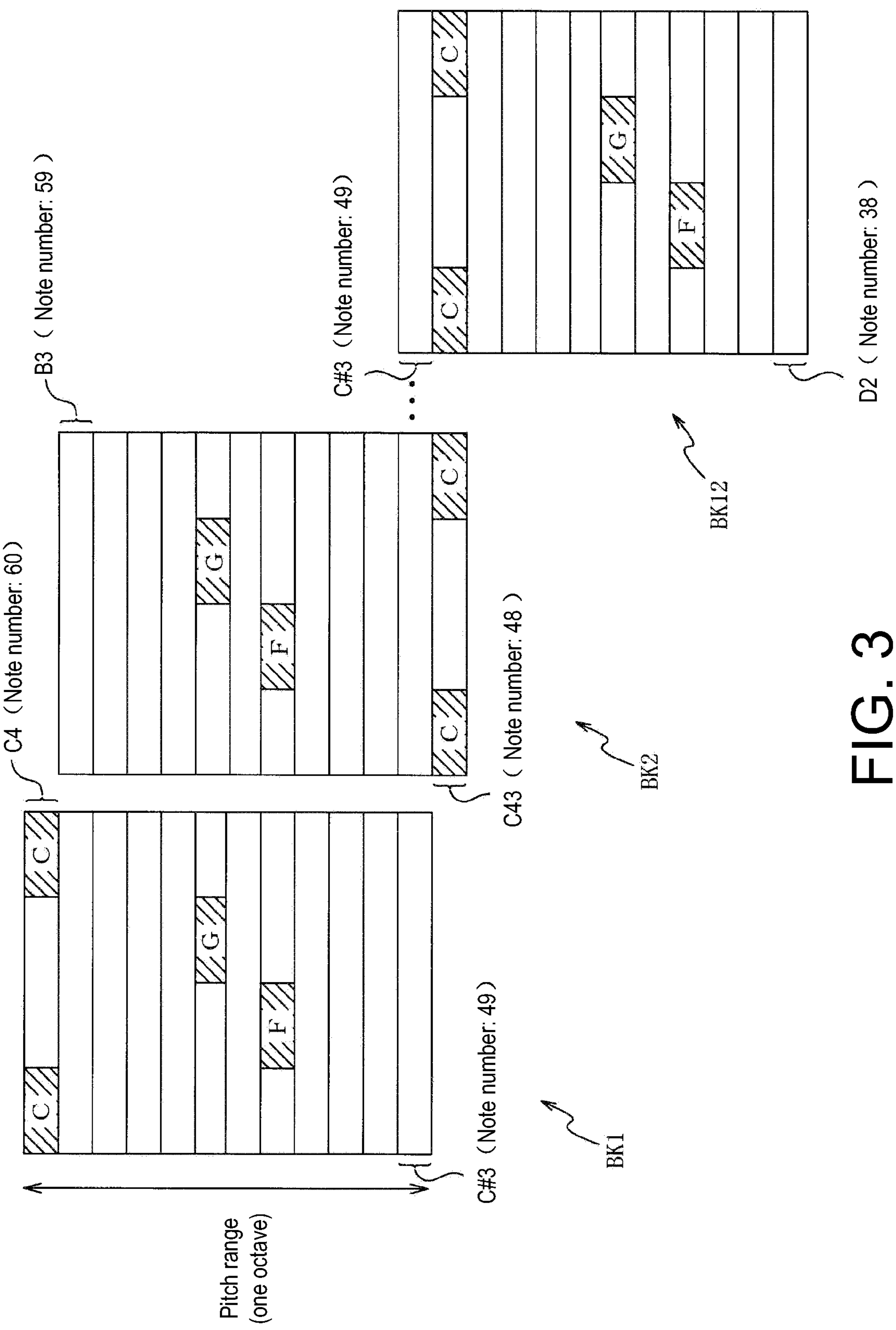
FIG. 3 is a diagram illustrating candidate accompaniment parts.

Next, a technique for generating an arranged accompaniment part Bb will be described with reference to FIGS. 3 and 4. FIG. 3 is a diagram illustrating candidate accompaniment parts BK1 to BK12. The arranged accompaniment part Bb is generated on the basis of chord data C of musical piece data M. In the chord data C according to this embodiment, a chord (C, D, or the like) and a sound production timing of the chord, in other words, a sound production start time, are stored (see (a) of FIG. 6), and the accompaniment part Bb is generated on the basis of a note name of a root note of each chord stored in the chord data C, in a case in which the chord is a fraction chord, a note name of a denominator side (for example, in a case in which the fraction chord is "C/E", a note name of the denominator side is "E"). Hereinafter, "the denominator side of the fraction chord" will simply be called "the denominator side."

More specifically, as illustrated in FIG. 3, in a pitch range that is a range of pitches corresponding to one octave, candidate accompaniment parts BK1 to BK12 that are accompaniment parts in which note names of root notes or denominator-side note names of chords acquired from the chord data C are arranged such that sounds of corresponding pitches are produced at sound production timings of the chords are generated, and an arranged accompaniment part Bb is selected from among those candidate accompaniment parts BK1 to BK12.

In this embodiment, the candidate accompaniment parts BK1 to BK12 are generated from ranges of pitches each acquired by shifting the pitch ranges by one semitone. More specifically, the pitch range of the candidate accompaniment part BK1 according to this embodiment is set to a range of pitches corresponding to one octave of C4 (note number 60) to C#3 (note number 49), and the candidate accompaniment part BK1 is generated in such a range. In other words, in a case in which progression of note names of root notes or denominators-side note names of chords acquired from the chord data C is "C→F→G→C," in the pitch range described above, "C4→F3→G3→C4" that are sounds of pitches corresponding to such note names are acquired, and a part in which these are arranged such that they are produced at sound production timings of corresponding chords in the chord data C is regarded as the candidate accompaniment part BK1.

In the candidate accompaniment part BK2 following the candidate accompaniment part BK1, a pitch range thereof is set to a range of pitches that are lower than those of the candidate accompaniment part BK1 by one semitone. In other words, in the candidate accompaniment part BK2, B3 (note number 59) to C3 (note number 48) are set to a pitch range. Thus, "C3→F3→G3→C3" is generated as the candidate accompaniment part BK2.

While the pitch range is shifted by one semitone, candidate accompaniment parts BK3 to BK12 are generated. In this way, multiple accompaniment parts acquired by changing the pitch ranges by 12 semitones, that is, one octave, are each generated in accordance with the candidate accompaniment parts BK1 to BK12. An arranged accompaniment part Bb is selected from among the candidate accompaniment parts BK1 to BK12 generated in this way. A technique for selecting an arranged accompaniment part Bb will be described with reference to FIG. 4.

Figure 4:
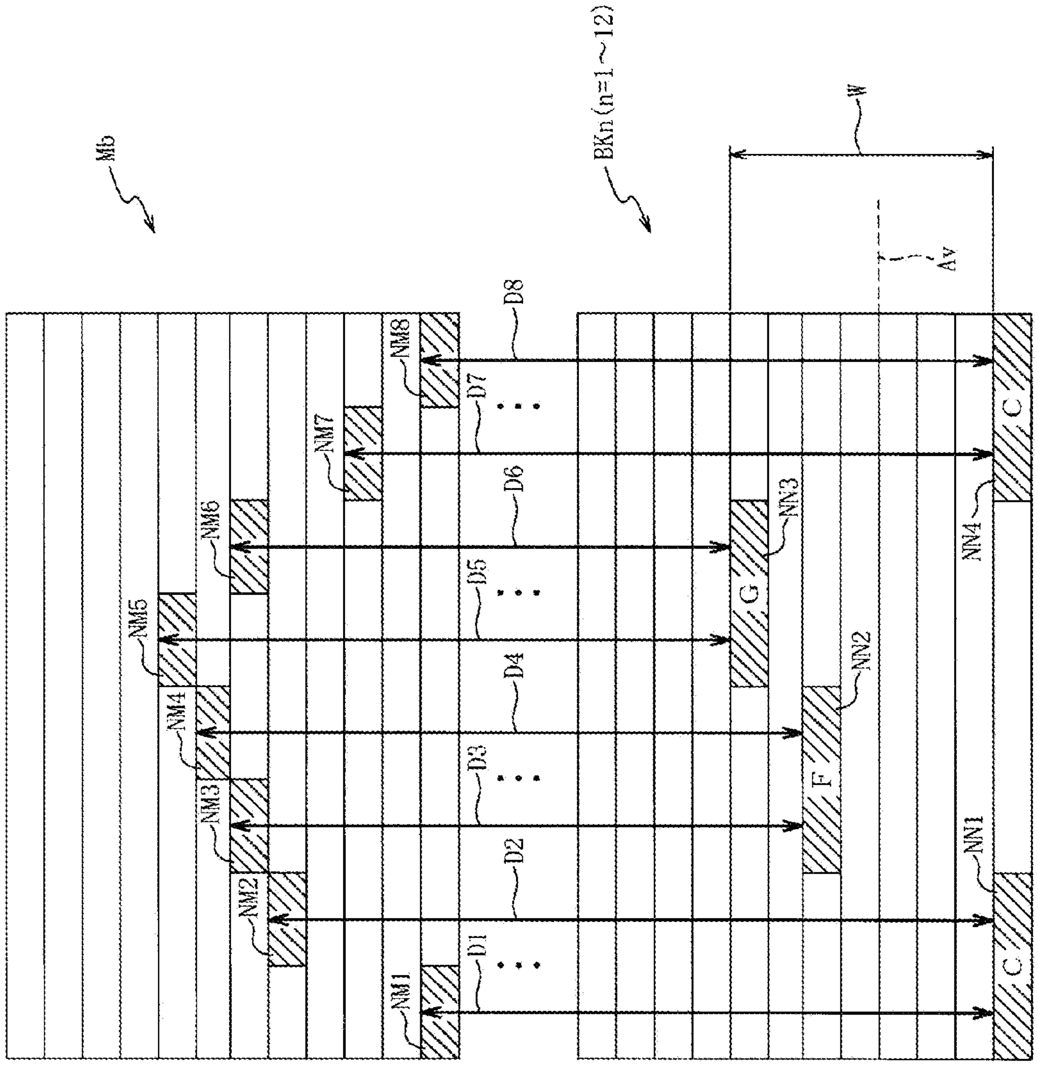
FIG. 4 is a diagram illustrating selection of an arranged accompaniment part from the candidate accompaniment parts.

FIG. 4 is a diagram illustrating selection of an arranged accompaniment part Bb from the candidate accompaniment parts BK1 to BK12. An evaluation value E to be described below is calculated for each of the candidate accompaniment parts BK1 to BK12, and an arranged accompaniment part Bb is selected from among the candidate accompaniment parts BK1 to BK12 on the basis of calculated evaluation values E. In FIG. 4, any one of the candidate accompaniment parts BK1 to BK12 will be represented as "candidate accompaniment part BKn" (here, n is an integer of 1 to 12).

First, pitch differences D1 to D8 between notes NN1 to NN4 composing the candidate accompaniment part BKn and notes NM1 to NM8 of the arranged melody part Mb that are produced at the same time are calculated, and a standard deviation S according to the calculated pitch differences D1 to D8 is calculated. As a technique for calculating the standard deviation S, a known technique is applied, and thus detailed description thereof will be omitted.

Next, an average value Av of the pitches of the notes NN1 to NN4 composing the candidate accompaniment part BKn is calculated, and a difference value D that is an absolute value of a difference value between the average value Av and a specific pitch (a note number 53 in this embodiment) is calculated. Next, a keyboard range W that is a pitch difference between the highest pitch and the lowest pitch among the notes NN1 to NN4 composing the candidate accompaniment part BKn is calculated. In addition, the specific pitch used in the calculation of the difference value D is not limited to the note number 53 and may be equal to or lower than 53 or equal to or higher than 53.

An evaluation value E is calculated using the following Equation 1 on the basis of the standard deviation S, the difference value D, and the keyboard range W that have been calculated.

$$E=(S*100000)+(D*1000)+W \quad \text{(Equation 1)}$$

Here, coefficients by which the standard deviation S, the difference value D, and the keyboard range W are multiplied in Equation 1 are not limited to those represented above, and arbitrary values may be used as appropriate.

Such evaluation values E are calculated for all the candidate accompaniment parts BK1 to BK12, and one of the candidate accompaniment parts BK1 to BK12 that has the smallest evaluation value E is selected as the arranged accompaniment part Bb.

As described above, the candidate accompaniment parts BK1 to BK12 are composed by only note names of root notes or denominator-side note names of chords of the chord data C of the musical piece data M. In accordance with this, also for the candidate accompaniment parts BK1 to BK12 performed by the user using his or her left hand, the number of sounds that are produced at the same time as a whole can be decreased.

Here, the chords of the chord data C of the musical piece data M represent chord progression of the musical piece, and a root note or a denominator-side sound of a chord is a sound that forms a basis of the chord. Thus, by composing the candidate accompaniment parts BK1 to BK12 using root notes or denominator-side sounds of the chords, the chord progression of the musical piece data M can be appropriately maintained.

Evaluation values E are calculated on the basis of the candidate accompaniment parts BK1 to BK12 generated in this way, and a candidate accompaniment part having the smallest evaluation value E is selected as the arranged accompaniment part Bb. More specifically, by setting a candidate accompaniment part having a small standard deviation S composing the evaluation value E as the arranged accompaniment part Bb, one of the candidate accompaniment parts BK1 to BK12 having a small pitch difference from that of the melody part Mb described above is selected as the accompaniment part Bb. In accordance with this, an accompaniment part for which a distance between the right hand, which performs a melody part Mb, and the left hand, which performs the accompaniment part, of the user H is small, and movement unbalance between the right hand and the left hand is small is selected as the accompaniment part Bb, and thus arranged data A that can be easily performed by a user H even when the user H is a beginner is formed.

By setting a candidate accompaniment part having a small difference value D composing the evaluation value E as the arranged accompaniment part Bb, and thus a pitch difference between a sound included in the accompaniment part Bb and a sound of a specific pitch (in other words, the note number 53) can be decreased. In accordance with this, movement of the left hand of the user H performing the accompaniment part Bb can be limited near the sound of the specific pitch, and thus arranged data A that can be easily performed is formed.

In addition, by setting a candidate accompaniment part of which the keyboard range W composing the evaluation value E is small as the arranged accompaniment part Bb, a difference between a sound of the highest pitch and a sound of the lowest pitch included in the accompaniment part Bb can be decreased. In accordance with this, a maximum amount of movement of the left hand of the user H performing the accompaniment part Bb can be decreased, and thus arranged data A that can be easily performed is formed.

The evaluation value E is configured as a value that is acquired by adding the standard deviation S, the difference value D, and the keyboard range W. Thus, by selecting one of the candidate accompaniment parts BK1 to BK12 as the accompaniment part Bb in accordance with such an evaluation value E, an accompaniment part for which a distance between the right hand, which performs the melody part Mb, and the left hand, which performs the accompaniment part Bb, of a user H is short, a pitch difference between a sound included in the accompaniment part Bb and a sound of the specific pitch is small, and a difference between a sound of the highest pitch and a sound of the lowest pitch included in the accompaniment part Bb is small and which is well balanced and can be easily performed by the user H can be selected as the accompaniment part Bb.

Figure 5:
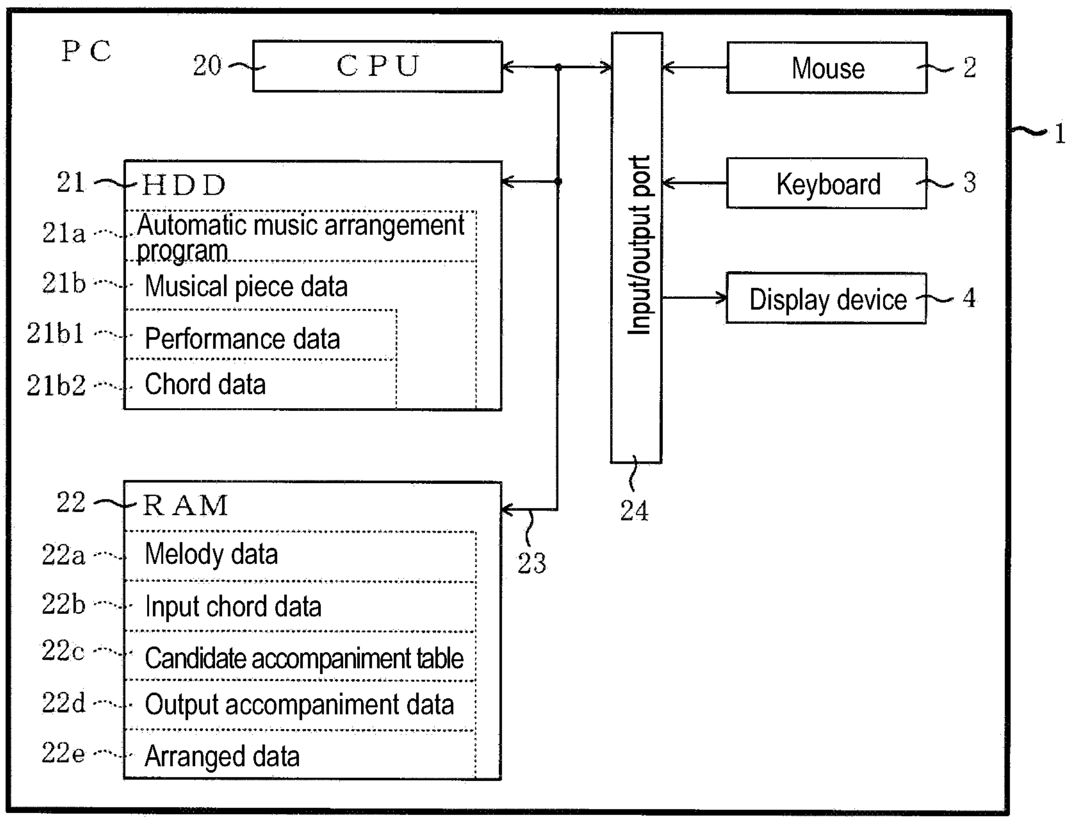
In FIG. 5, (a) is a block diagram illustrating the electric configuration of a PC, and (b) is a diagram schematically illustrating performance data and melody data.

Next, the electric configuration of the PC 1 will be described with reference to FIGS. 5 and 6. In FIG. 5, (a) is a block diagram illustrating the electric configuration of the PC 1. The PC 1 includes a CPU 20, a hard disk drive (HDD) 21, and a RAM 22, and these are connected to an input/output port 24 through a bus line 23. In addition, the mouse 2, the keyboard 3, and the display device 4 described above are connected to the input/output port 24.

Figure 7:
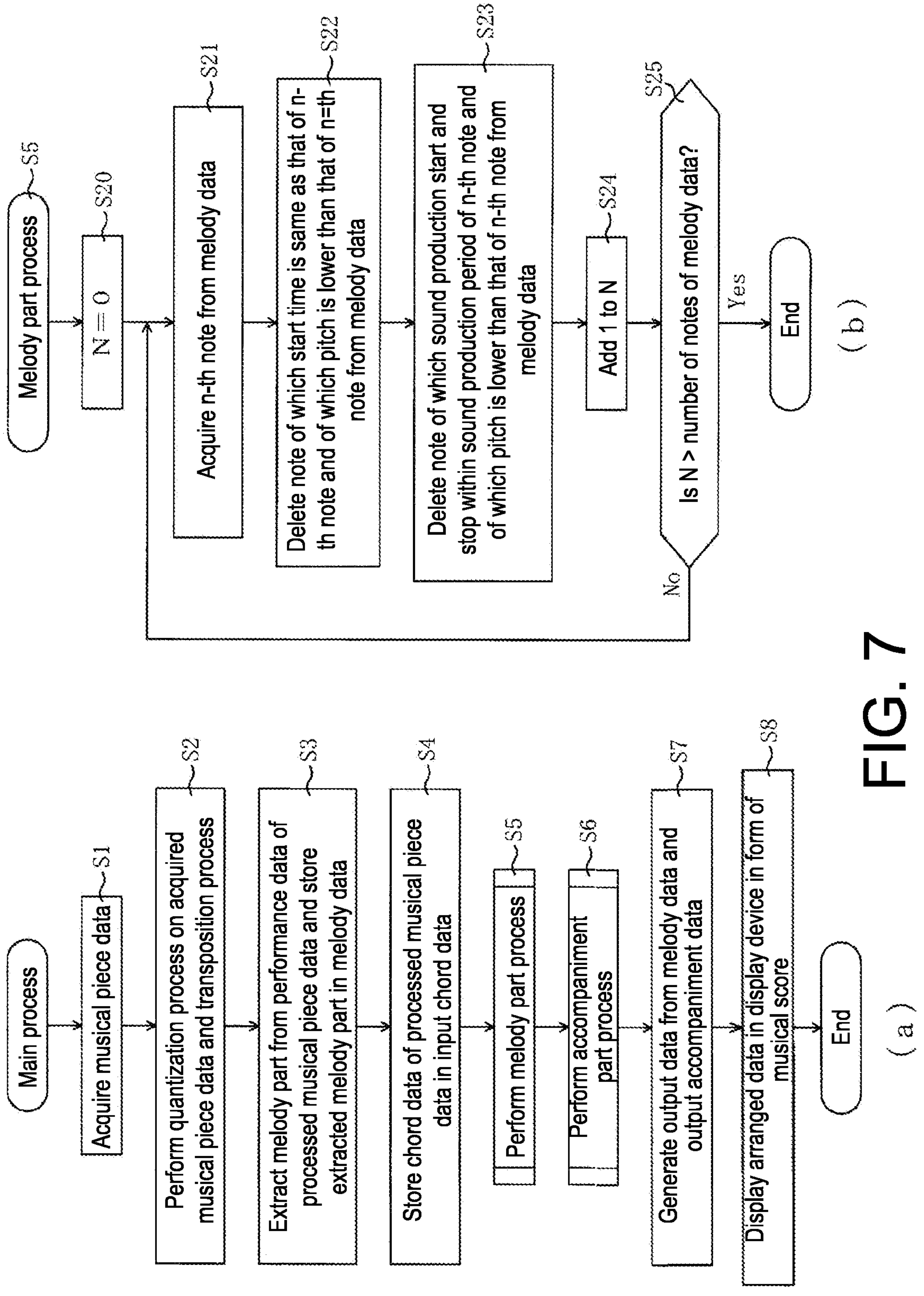
In FIG. 7, (a) is a flowchart of a main process, and (b) is a flowchart of a melody part process.

The CPU 20 is an arithmetic operation device that controls each part connected through the bus line 23. The HDD 21 is a rewritable nonvolatile storage device that stores programs executed by the CPU 20, fixed-value data, and the like and stores an automatic music arrangement program **21*a* and musical piece data 21*b*. When the automatic music arrangement program 21*a* is executed by the CPU 20, a main process of (a) of FIG. 7 is executed. In the musical piece data 21*b*, the musical piece data M described above is stored, and performance data 21*b*1 and chord data 21*b*2 are disposed. The performance data 21*b*1 and the chord data 21*b*2 will be described with reference to (b) of FIG. 5 and (a) of FIG. 6**.

In FIG. 5, (b) is a diagram schematically illustrating the performance data **21*b*1 and the melody data 22*a* to be described below. The performance data 21*b*1 is a data table in which the performance data P of the musical piece data M described above is stored. In the performance data 21*b*1, a note number of each note of the performance data P and a start time and a sound production time thereof are stored in association with each other. In this embodiment, although "tick" is used as a time unit of a start time, a sound production time, and the like, other time units such as "seconds", "minutes", and the like may be used. Although an accompaniment part, grace notes, and the like set in the musical piece data M in advance are included in the performance data P stored in the performance data 21*b*1** according to this embodiment in addition to the melody part Ma described above, only the melody part Ma may be included therein.

In FIG. 6, (a) is a diagram schematically illustrating the chord data **21*b*2 and input chord data 22*b* to be described below. The chord data 21*b*2 is a data table in which the chord data C of the musical piece data M described above is stored. In the chord data 21*b*2, note names of chords (in other words, chord names) of the chord data C and start times thereof are stored in association with each other. In this embodiment, only one chord can be produced at the same time, and, more specifically, in a case in which a chord stored in the chord data 21*b*2** starts to be produced at a start time thereof, the sound production stops at a start time of the next chord, and immediately after that, the next chord starts to be produced.

Description will be continued with reference back to (a) of FIG. 5. The RAM 22 is a memory used for storing various kinds of work data, flags, and the like in a rewritable manner when the CPU 20 executes the automatic music arrangement program 21*a*, and melody data 22*a*, input chord data 22*b*, a candidate accompaniment table 22*c*, output accompaniment data 22*d*, and arranged data 22*e* in which the arranged data A described above is stored are stored therein.

In the melody data 22*a*, the melody part Ma of the musical piece data M described above or the arranged melody part Mb are stored. The data structure of the melody data 22*a* is the same as that of the performance data 21*b*1 described above with reference to (b) of FIG. 5, and thus description thereof will be omitted. By deleting notes of the melody part Ma stored in the melody data 22*a* using the technique described above with reference to FIG. 2, and thus the melody part Mb is stored in the melody data 22*a*.

In the input chord data 22*b*, chord data C acquired from the chord data 21*b*2 of the musical piece data 21*b* described above is stored. The data structure of the input chord data 22*b* is the same as that of the chord data 21*b*2 described above with reference to (a) of FIG. 6, and thus description thereof will be omitted.

The candidate accompaniment table 22*c* is a data table in which the candidate accompaniment parts BK1 to BK12 described above with reference to FIGS. 3 and 4 are stored, and the output accompaniment data 22*d* is a data table in which the arranged accompaniment part Bb selected from the candidate accompaniment parts BK1 to BK12 is stored. The candidate accompaniment table 22*c* and the output accompaniment data 22*d* will be described with reference to (b) and (c) of FIG. 6.

In FIG. 6, (b) is a diagram schematically illustrating the candidate accompaniment table 22*c*. As illustrated in (b) of FIG. 6, in the candidate accompaniment table 22*c*, for each of the candidate accompaniment parts BK1 to BK12, note numbers and the standard deviation S, the difference value D, the keyboard range W, and the evaluation value E described above with reference to FIG. 4 are stored in association with each other. In (b) of FIG. 6, "No. 1" corresponds to the "candidate accompaniment part BK1", "No. 2" corresponds to the "candidate accompaniment part BK2", and similarly, "No. 3" to "No. 12" respectively correspond to the "candidate accompaniment part BK3" to the "candidate accompaniment part BK12".

In FIG. 6, (c) is a diagram schematically illustrating output accompaniment data 22*d*. As illustrated in (c) of FIG. 6, in the output accompaniment data 22*d*, note numbers and respective start times of the note numbers in the arranged accompaniment part Bb selected from among the candidate accompaniment parts BK1 to BK12 are stored in association with each other. Also for the output accompaniment data 22*d*, similar to the chord data 21*b*2 illustrated in (a) of FIG. 6, in a case in which a sound of a note number stored in the output accompaniment data 22*d* starts to be produced at a start time thereof, the sound production stops at a start time of a sound of a next note number, and, immediately after that, a sound of a next note number starts to be produced.

Next, a main process executed by the CPU 20 of the PC 1 will be described with reference to FIGS. 7 to 9. In FIG. 7, (a) is a flowchart of the main process. The main process is a process that is executed in a case in which the PC 1 is directed to execute the automatic music arrangement program 21*a*.

In the main process, first, musical piece data M is acquired from musical piece data 21*b* (S1). A place from which the musical piece data M is acquired is not limited to the musical piece data 21*b* and, for example, the musical piece data M may be acquired from another PC or the like through a communication device not illustrated in the drawing.

After the process of S1, a quantization process is performed on the acquired musical piece data M, and a transposition process into C Major or A Minor is performed (S2). The quantization process is a process of correcting a slight difference between sound production timings when real-time recording is performed.

There are cases in which notes included in the musical piece data M are recorded by recording an actual performance, and, in such cases, a sound production timing may slightly deviate. Thus, by performing a quantization process on the musical piece data M, a start time and a stop time of sound production of each note included in the musical piece data M can be corrected, and thus, notes of which sound production starts at the same time among notes included in the musical piece data M and the like can be accurately identified, and the outer voice note Vg and the inner voice note Vi described above with reference to FIG. 2 can be accurately identified.

In addition, by performing a transposition process on the musical piece data M into C Major or A Minor, in a case in which arranged data A acquired by arranging the musical piece data M is performed by a keyboard instrument, the frequency of use of chromatic keys can be reduced. Before and after the transposition process on the musical piece data M will be compared with each other with reference to (a) and (b) of FIG. 9.

Figure 9:
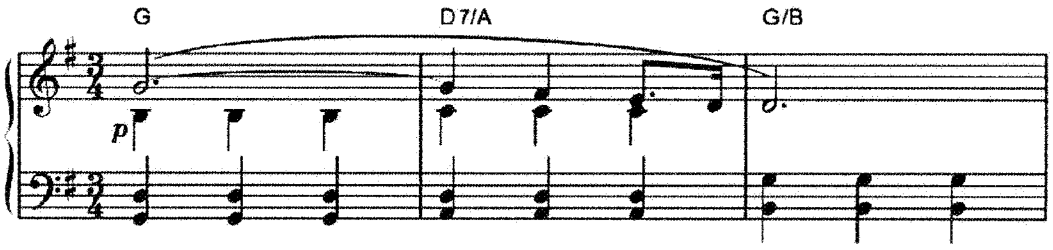
In FIG. 9, (a) is a diagram illustrating musical piece data in the form of a musical score, (b) is a diagram illustrating musical piece data on which a transposition process has been performed in the form of a musical score, and (c) is a diagram illustrating arranged data in the form of a musical score.
Figure 9:
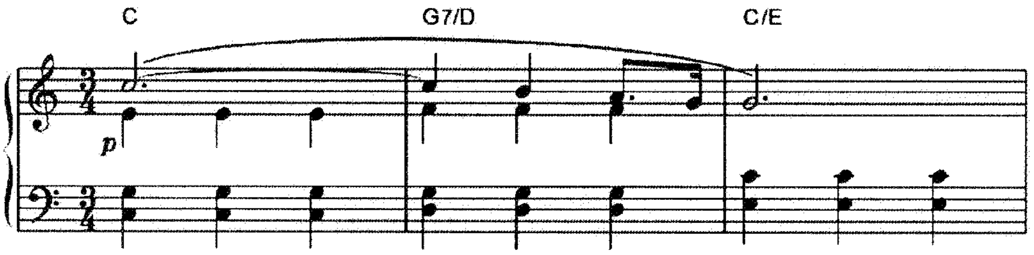
Figure 9:
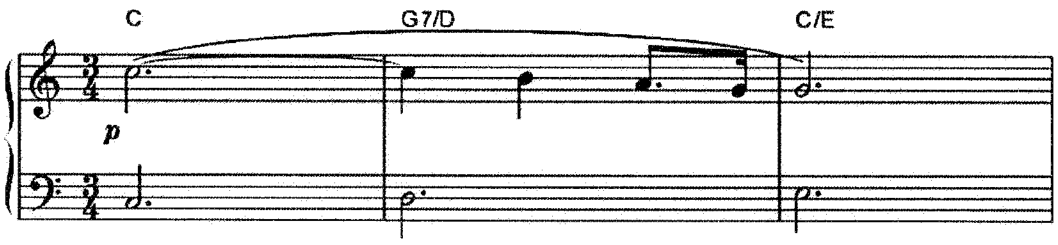

In FIG. 9, (a) is a diagram illustrating musical piece data M in the form of a musical score, and (b) is a diagram illustrating musical piece data M on which a transposition process has been performed in the form of a musical score. In FIG. 9, (a) to (c) illustrate an example in which arranged data A is generated from a musical piece data M using a part of "Ombra mai fu" composed by Handel as the musical piece data M. In (a) to (c) of FIG. 9, an upper stage side of a musical score (in other words, a G clef side) represents a melody part, a lower stage side of the musical score (in other words, an F clef side) represents an accompaniment part, and G, D7/A and the like written on an upper side of the musical score represent chords. In other words, the upper stage of the musical score in (a) of FIG. 9 represents the melody part Ma.

As illustrated in (a) of FIG. 9, a key of the musical piece data M is G Major. In a major scale of G Major, use of chromatic keys together withs white keys of an organ or a piano that is a keyboard instrument is included, and thus G Major is a "key" that is difficult to perform by a user H having a low performance skill. Thus, in the process of S2 illustrated in (a) of FIG. 7, by performing the process of transposing "Key" of the musical piece data M into "C Major" of which a major scale is composed of only white keys of an organ or a piano that is a keyboard instrument, the frequency of operations of the user H on chromatic keys can be reduced. In accordance with this, the user H can easily perform the musical piece data. At this time, also the chord data C of the musical piece data is similarly processed to be transposed into C Major.

The quantization process and the transposition process are performed using known technologies, and thus detailed description thereof will be omitted. In addition, in the process of S2, both the quantization process and the transposition process do not need to be performed, for example, only the quantization process may be performed, only the transposition process may be performed, or the quantization process and the transposition process may be omitted. Furthermore, the transposition process is not limited to conversion into "C Major", and conversion into another key such as G Major may be performed.

Description will be continued with reference back to (a) of FIG. 7. After the process of S2, a melody part Ma is extracted from performance data P of the musical piece data M on which the quantization process and the transposition process have been performed and is stored in the melody data 22*a* (S3). A technique for extracting the melody part Ma from the performance data P is executed using a known technology, and thus description thereof will be omitted. After the process of S3, chord data C of the musical piece data M on which the quantization process and the transposition process have been performed is stored in the input chord data 22*b* (S4).

After the process of S4, a melody part process (S5) is executed. The melody part process will be described with reference to (b) of FIG. 7.

In FIG. 7, (b) is a flowchart of the melody part process. The melody part process is a process of generating an arranged melody part Mb from the melody part Ma of the melody data 22*a*. In the melody part process, first, "0" is set to a counter variable N that represents a position in the melody data 22*a* (in other words, "No." in (b) of FIG. 5).

After the process of S20, an N-th note is acquired from the melody data 22*a* (S21). After the process of S21, a note having the same start time as that of the N-th note acquired in S21 and having a pitch lower than that of the N-th note, in other words, a note of a note number smaller than the note number of the N-th note is deleted from the melody data 22*a* (S22). After the process of S22, a note of which sound production starts and stops within a sound production period of the N-th note and of which a pitch is lower than that of the N-th note is deleted from the melody data 22*a* (S23).

After the process of S23, 1 is added to the counter variable N (S24), and it is checked whether or not the counter variable N is larger than the number of notes of the melody data 22*a* (S25). In the process of S25, in a case in which the counter variable N is equal to or smaller than the number of the notes of the melody data 22*a*, the processes of S21 and subsequent steps are repeated. On the other hand, in the process of S25, in a case in which the counter variable N is larger than the number of the notes of the melody data 22*a*, the melody part process ends.

In other words, in accordance with the processes of S22 and S23, in a case in which the N-th note is an outer voice note Vg, a note of which a start time is the same as that of the N-th note in the melody data 22*a* and of which a pitch is lower than that of the N-th note is identified as an inner voice note Vi and is deleted from the melody data 22*a*. In addition, a note of which sound production starts and ends within a sound production period of the N-th note and of which a pitch is lower than that of the N-th note is also identified as an inner voice note Vi and is deleted from the melody data 22*a*. By performing such a process for all the notes stored in the melody data 22*a*, an arranged melody part Mb acquired by deleting inner voice notes Vi from the melody part Ma of the musical piece data M are deleted is stored in the melody data 22*a*.

Description will be continued with reference back to (a) of FIG. 7. After the melody part process of S5, an accompaniment part process (S6) is executed. The accompaniment part process will be described with reference to FIG. 8.

Figure 8:
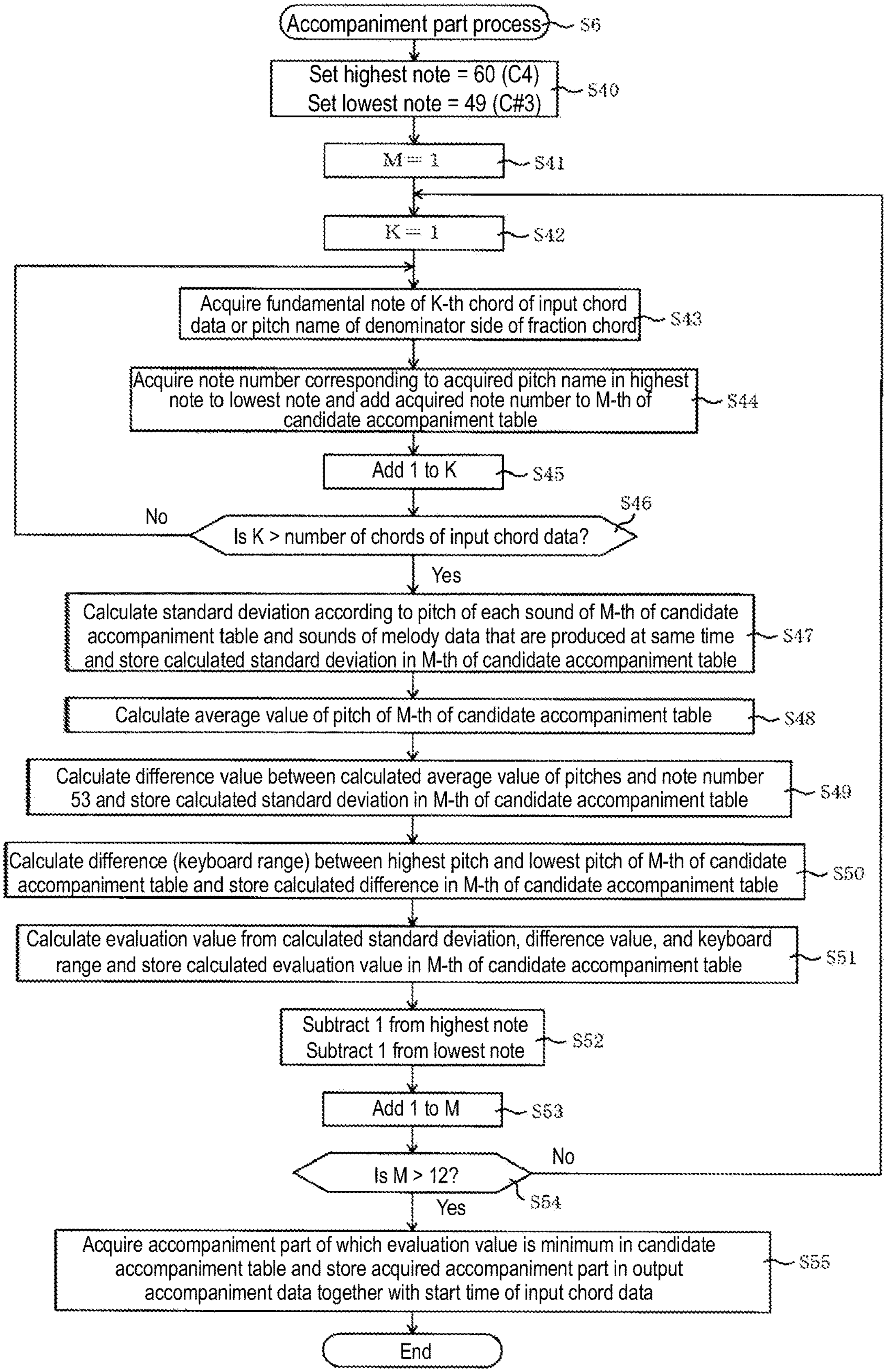
FIG. 8 is a flowchart of an accompaniment part process.

FIG. 8 is a flowchart of the accompaniment part process. The accompaniment part process is a process of generating the candidate accompaniment parts BK1 to BK12 described above with reference to FIG. 3 on the basis of a chord of the input chord data 22*b* and selecting an arranged accompaniment part Bb from the generated candidate accompaniment parts BK1 to BK12.

In the accompaniment part process, first, "60(C4)" is set to a highest note representing a note number of a highest pitch in the pitch range described above with reference to FIGS. 3, and "49 (C#3)" is set to a lowest note representing a note number of a lowest pitch in the pitch range (S40). As described with reference to FIG. 3, the pitch range of the candidate accompaniment part BK1 is "60 (C4) to 49 (C#3)", and thus "60 (C4)" is set to an initial value of the highest note, and "49 (C#3)" is set to an initial value of the lowest note.

After the process of S40, 1 is set to a counter variable M representing the position of the candidate accompaniment table 22*c* (in other words, "No." illustrated in (b) of FIG. 6) (S41), and 1 is set to a counter variable K representing the position of the input chord data 22*b* (in other words, "No." illustrated in (a) of FIG. 6) (S42).

After the process of S42, a note name of a root note of the K-th chord of the input chord data 22*b* or, in a case in which the K-th chord is a fraction chord, a note name of the denominator side is acquired (S43). After the process of S43, a note number corresponding to the note name acquired in the process of S43 in a highest note to a lowest note of the pitch range is acquired and is added to the chords of the M-th record of the candidate accompaniment table 22*c* (S44).

For example, in a case in which the highest note of the pitch range is 60 (C4), and the lowest note is 49 (C#3), when the pitch acquired in the process of S43 is "C", "C4" that is a pitch corresponding to "C" within such a pitch range is acquired, and the note number thereof is added to the candidate accompaniment table 22*c*.

After the process of S44, 1 is added to the counter variable K (S45), and it is checked whether or not the counter variable K is larger than the number of chords stored in the input chord data 22*b* (S46). In a case in which the counter variable K is equal to or smaller than the number of the chords stored in the input chord data 22*b* in the process of S46 (S46: No), a chord that has not been processed is included in the input chord data 22*b*, and thus the processes of S43 and subsequent steps are repeated.

On the other hand, in a case in which the counter variable K is larger than the number of the chords stored in the input chord data 22*b* in the process of S46 (S46: Yes), it is determined that generation of the M-th accompaniment part among the candidate accompaniment parts BK1 to BK12 has been completed from the chords of the input chord data 22*b*. Thus, a standard deviation S according to a pitch difference between each sound of the M-th record of the generated candidate accompaniment table 22*c* and the sound of the arranged melody part Mb of the melody data 22*a* that is produced at the same time described above with reference to FIG. 4 is calculated and is stored in the M-th record of the candidate accompaniment table 22*c* (S47).

After the process of S47, an average value Av of pitches of sounds included in the M-th record of the candidate accompaniment table 22*c* described above with reference to FIG. 4 is calculated (S48), and a difference value D that is a difference between the calculated average value Av and the note number 53 is calculated and is stored in the M-th record of the candidate accompaniment table 22*c* (S49). After the process of S49, a keyboard range W that is a pitch difference between a sound of the highest pitch and a sound of the lowest pitch among sounds included in the M-th record of the candidate accompaniment table 22*c* described above with reference to FIG. 4 is calculated and is stored in the M-th record of the candidate accompaniment table 22*c* (S50).

After the process of S50, an evaluation value E is calculated using Equation 1 described above on the basis of the standard deviation S, the difference value D, and the keyboard range W stored in the M-th record of the candidate accompaniment table 22*c* and is stored in the M-th record of the candidate accompaniment table 22*c* (S51).

After the process of S51, in order to generate the next candidate accompaniment parts BK1 to BK12, by subtracting the highest note and the lowest note of the pitch range by one, the pitch range is set to a range of pitches lowered by one semitone (S52). After the process of S52, 1 is added to the counter variable M (S53), and it is checked whether the counter variable M is larger than 12 (S54). In a case in which the counter variable M is equal to or smaller than 12 in the process of S54 (S54: No), there are candidate accompaniment parts BK1 to BK12 that have not been generated, and thus the processes of S42 and subsequent steps are repeated.

On the other hand, in a case in which the counter variable M is larger than 12 in the process of S54 (S54: Yes), candidate accompaniment parts BK1 to BK12 of which evaluation values E are minimums in the candidate accompaniment table 22*c* are acquired, and start times of chords corresponding to note numbers of sounds composing the acquired candidate accompaniment parts BK1 to BK12 and each note number acquired from the input chord data 22*b* are stored in the output accompaniment data (S55). After the process of S55, the accompaniment part process ends.

In accordance with this, the candidate accompaniment parts BK1 to BK12 according to only root notes or denominator-side sounds of chords are generated from chords of the input chord data 22*b*, and a candidate accompaniment part among them having the smallest evaluation value E is stored in the output accompaniment data 22*d* as the accompaniment part Bb.

Description will be continued with reference back to (a) of FIG. 7. After the accompaniment part process of S6, arranged data A is generated from the melody data 22*a* and the output accompaniment data 22*d* and is stored in the arranged data 22*e* (S7). More specifically, arranged data A in which the arranged melody part Mb of the melody data 22*a* is set as a melody part, and the accompaniment part Bb of the output accompaniment data 22*d* is set as an accompaniment part is generated and is stored in the arranged data 22*e*. At this time, chord progression corresponding to each sound of the accompaniment part Bb may be also stored in the arranged data 22*e*.

After the process of S7, the arranged data A stored in the arranged data 22*e* is displayed in the display device 4 in the form of a musical score (S8), and the main process ends. Here, the arranged data A generated from the musical piece data M will be described with reference to (b) and (c) of FIG. 9.

In FIG. 9, (c) is a diagram illustrating the arranged data A in the form of a musical score. In the musical score, which is acquired by performing a transposition process on the musical piece data M illustrated in (a) of FIG. 9, illustrated in (b) of FIG. 9, generation of two or more sounds at the same time is included multiple times in the melody part Ma (in other words, the upper stage of the musical score, the G clef side) for the musical score acquired by performing a transposition process on the musical piece data M illustrated in (a) of FIG. 9, and it is difficult to perform the musical score for a user H having a low performance function.

Then, among notes that start to be produced at the same time in such a melody part Ma, a note having the highest pitch is identified as an outer voice note Vg, a note N2 of which a pitch is lower than that of the outer voice note Vg is identified as an inner voice note Vi, and a note of which sound production starts and ends within a sound production period of the note identified as the outer voice note Vg is acquired and is additionally identified as an inner voice note Vi. Then, by deleting the inner voice notes Vi from the melody part Ma, similar to the melody part Mb illustrated in (c) of FIG. 9, the number of sounds that are produced at the same time can be decreased. In accordance with this, the melody part becomes the melody part Mb that can be easily performed by the user H.

In addition, the outer voice note Vg included in the arranged data A is composed of a sound that has a high pitch and is heard conspicuously for a listener in the melody part Ma of the musical piece data M. In accordance with this, the melody part Mb of the arranged data A can maintain to be the melody part Ma of the musical piece data M.

On the other hand, the accompaniment part Bb of the arranged data A (in other words, a lower stage of the musical score in (c) of FIG. 9, the F clef side) is generated only from root notes or denominator-side sounds of the chords of the chord data C of the musical piece data M. In accordance with this, the number of sounds that are produced at the same time is decreased as a whole also for the accompaniment part Bb, and thus, the accompaniment part Bb becomes an accompaniment part that can be easily performed by the user H.

Here, the chords of the chord data C of the musical piece data M represents chord progression of the musical piece, and a root note or a denominator-side sound of a chord is a sound that becomes a base of the chord. Thus, by composing the accompaniment part Bb using the root notes or the denominator-side sounds of the chords, the chord progression of the musical piece data M can be appropriately maintained.

Generally, the frequency of changes in the sounds of the chords of the chord data C is lower than that of the accompaniment part that is originally included in the musical piece data M (in other words, the lower stage of the musical score illustrated in (b) of FIG. 9; the F clef side). Thus, by generating the accompaniment part Bb from the chord data C of the musical piece data M, the frequency of changes in the sounds of the accompaniment part Bb can be decreased. In addition, the chord composition of a chord is formed using only root notes or denominator-side sounds, and thus the number of sounds that are produced at the same time is decreased. Also in accordance with this, the accompaniment part Bb can be formed as an accompaniment part that can be easily performed by a user H.

As above, although the description has been presented on the basis of the embodiment described above, it can be easily understood that various modifications and alterations can be made.

In the embodiment described above, as the outer voice note Vg, a note having the highest pitch among notes of which start times are the same in the musical piece data M is selected. However, the configuration is not limited thereto, and a note of which the pitch is the highest and of which a sound production time is equal to or longer than a predetermined time (for example, a time corresponding to a quarter note) among notes of which start times are the same in the musical piece data M may be identified as an outer voice note Vg. In accordance with this, in a case in which a sound production time is shorter than a predetermined time, and a chord is produced at the same time in a short time, no outer voice note Vg is identified, and such a chord can be caused to remain in the arranged melody part Mb, and thus, the arranged melody part Mb can be more appropriately maintained to be the melody part Ma of the musical piece data M.

In the embodiment described above, a note of which sound production starts and stops within the sound production period of the outer voice note Vg is identified as an inner voice note Vi. However, the configuration is not limited thereto, and all the notes of which sound production starts within the sound production period of the outer voice note Vg may be identified as inner voice notes Vi. In addition, notes of which sound production times are equal to or shorter than a predetermined time (for example, a time corresponding to a quarter note) among notes of which sound production starts within the sound production period of the outer voice note Vg and stops after stopping of the sound production of the outer voice note Vg may be identified as inner voice notes Vi.

In the embodiment described above, in generation of the candidate accompaniment parts BK1 to BK12, the pitch range is set to be shifted to be lowered by one semitone each time. However, the configuration is not limited thereto, and the pitch range may be raised by one semitone each time. In addition, the pitch range is not limited to being shifted by one semitone each time and may be shifted by two semitones or more each time.

In the embodiment described above, by using a standard deviation S according to pitch differences between the candidate accompaniment parts BK1 to BK12 and the arranged melody part Mb, a state of such pitch differences is evaluated. However, the evaluation is not limited thereto, and, by using another index such as an average value, a median value, or a dispersion of pitch differences between the candidate accompaniment parts BK1 to BK12 and the arranged melody part Mb, a state of such pitch differences may be evaluated.

In the embodiment described above, in the processes of S47 to S51 illustrated in FIG. 8, when the candidate accompaniment parts BK1 to BK12 are generated, all the candidate accompaniment parts BK1 to BK12 are stored in the candidate accompaniment table 22*c*, and one of the candidate accompaniment parts that has the smallest evaluation value E in the candidate accompaniment table 22*c* is selected as the accompaniment part Bb in the process of S55. However, the configuration is not limited thereto, upper limit values of the standard deviation S, the difference value D, and the keyboard range W (for example, an upper limit value "8" of the standard deviation S, an upper limit value "8" of the difference value D, an upper limit value "6" of the keyboard range W, and the like) may be set in advance, and candidate accompaniment parts BK1 to BK12 of which all the standard deviation S, the difference value D, and the keyboard range W are equal to or smaller than the respective upper limit values may be stored in the candidate accompaniment table 22*c*. In accordance with this, the number of candidate accompaniment parts BK1 to BK12 stored in the candidate accompaniment table 22*c* can be decreased, and thus a storage capacity required for the candidate accompaniment table 22*c* can be reduced, and the selection of the accompaniment part Bb based on the evaluation value E of the process of S55 can be quickly performed.

In the embodiment described above, arranged data A is generated from the arranged melody part Mb and the accompaniment part Bb. However, the configuration is not limited thereto, and arranged data A may be generated from the arranged melody part Mb and the accompaniment part extracted from the musical piece data M or may be generated from the melody part Ma of the musical piece data M and the arranged accompaniment part Bb. In addition, arranged data A may be generated only from the arranged melody part Mb, or arranged data A may be generated only from the arranged accompaniment part Bb.

In the embodiment, the musical piece data M is composed of the performance data P and the chord data C. However, the configuration is not limited thereto, and, for example, the chord data C may be omitted from the musical piece data M, chords may be recognized from the performance data P of the musical piece data M using a known technology, and chord data C may be configured from the recognized chords.

In the embodiment described above, in the process of S8 illustrated in (a) of FIG. 7, the arranged data A is displayed in the form of a musical score. However, the output of the arranged data A is not limited thereto, and, for example, the arranged data A may be reproduced, and a musical sound thereof may be output from a speaker not illustrated, or the arranged data A may be transmitted to another PC using a communication device not illustrated.

In the embodiment described above, although the PC 1 has been illustrated as a computer that executes the automatic music arrangement program 21*a* as an example, the subject of the execution is not limited thereto, and the automatic music arrangement program 21*a* may be executed using an information processing device such as a smartphone or a tablet terminal or an electronic instrument. In addition, the automatic music arrangement program 21*a* may be stored in a ROM or the like, and the disclosure may be applied to a dedicated device (an automatic music arrangement device) that executes only the automatic music arrangement program 21*a*.

The numerical values represented in the embodiment described above are examples, and, naturally, other numerical values may be employed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A non-transitory computer-readable storage medium stored with an automatic music arrangement program causing a computer to execute a process of music arrangement of a musical piece data, the automatic music arrangement program causing the computer to execute:

a musical piece acquiring step of acquiring the musical piece data by accessing a memory, wherein the musical piece data has a data structure that stores a plurality of musical notes, a start time corresponding to each musical note, a sound production period corresponding to each musical note, and a pitch corresponding to each musical note;

a melody acquiring step of extracting, from the musical piece data, the plurality of musical notes of the melody part and the start time, the sound production period and the pitch corresponding to each of the musical notes from the data structure of the musical piece data;

an outer voice identifying step of identifying one of a plurality of first musical notes having a highest pitch among the plurality of first musical notes of which the start times of sound production are approximately the same as an outer voice note based on the start time of the first musical notes extracted from the data structure of the musical piece data, among the musical notes acquired in the melody acquiring step;

an inner voice identifying step of identifying a second musical note of which sound production starts within the sound production period of the outer voice note identified in the outer voice identifying step and of which the pitch is lower than that of the outer voice note as an inner voice note based on the pitch and the sound production period corresponding to the first and second musical notes extracted from the data structure of the musical piece data, among the musical notes acquired in the melody acquiring step;

an arranged melody generating step of generating an arranged melody part by deleting the inner voice note identified in the inner voice identifying step from the musical notes acquired in the melody acquiring step;

an arranged data generating step of generating an arranged data on a basis of the arranged melody part generated in the arranged melody generating step; and an arranged data displaying step of displaying a simplified musical score having fewer musical notes with respect to a musical score corresponding to the musical piece data based on the arranged data on a display.

2. The non-transitory computer-readable storage medium stored with the automatic music arrangement program according to claim 1, wherein in the inner voice identifying step, the second musical note of which sound production starts and stops within the sound production period of the outer voice note identified in the outer voice identifying step and of which the pitch is lower than that of the outer voice note is identified as the inner voice note, among the musical notes acquired in the melody acquiring step.

3. The non-transitory computer-readable storage medium stored with the automatic music arrangement program according to claim 2, wherein in the outer voice identifying step, the first musical note of which the pitch is the highest and of which the sound production time is equal to or longer than a predetermined time among musical notes of which sound production start times are approximately the same is identified as the outer voice note, among the musical notes acquired in the melody acquiring step.

4. The non-transitory computer-readable storage medium stored with the automatic music arrangement program according to claim 2, wherein the computer is caused to further execute:

a chord information acquiring step of acquiring chords and sound production timings of the chords from the musical piece data acquired in the musical piece acquiring step, wherein the musical piece data further includes a data structure that stores chords and sound production timing corresponding to each of the chords;

a note name acquiring step of extracting note names of root notes of the chords acquired in the chord information acquiring step; and an arranged accompaniment generating step of generating an arranged accompaniment part for sound production of sounds of pitches corresponding to the note names acquired in the note name acquiring step in a pitch range that is a predetermined range of pitches at the sound production timings of the chords, which are acquired in the chord information acquiring step, corresponding to the sounds, wherein, in the arranged data generating step, the arranged data is generated on a basis of the melody part generated in the arranged melody generating step and the accompaniment part generated in the arranged accompaniment generating step.

5. The non-transitory computer-readable storage medium stored with the automatic music arrangement program according to claim 1, wherein in the outer voice identifying step, the first musical note of which the pitch is the highest and of which the sound production time is equal to or longer than a predetermined time among the first musical notes of which sound production start times are approximately the same is identified as the outer voice note, among the notes acquired in the melody acquiring step.

6. The non-transitory computer-readable storage medium stored with the automatic music arrangement program according to claim 3, wherein the computer is caused to further execute:

a chord information acquiring step of acquiring chords and sound production timings of the chords from the musical piece data acquired in the musical piece acquiring step, wherein the musical piece data further includes a data structure that stores chords and sound production timing corresponding to each of the chords;

a note name acquiring step of extracting note names of root notes of the chords acquired in the chord information acquiring step; and an arranged accompaniment generating step of generating an arranged accompaniment part for sound production of sounds of pitches corresponding to the note names acquired in the note name acquiring step in a pitch range that is a predetermined range of pitches at the sound production timings of the chords, which are acquired in the chord information acquiring step, corresponding to the sounds, wherein, in the arranged data generating step, the arranged data is generated on a basis of the melody part generated in the arranged melody generating step and the accompaniment part generated in the arranged accompaniment generating step.

7. The non-transitory computer-readable storage medium stored with the automatic music arrangement program according to claim 1, wherein the computer is caused to further execute:

a chord information acquiring step of acquiring chords and sound production timings of the chords from the musical piece data acquired in the musical piece acquiring step, wherein the musical piece data further includes a data structure that stores chords and sound production timing corresponding to each of the chords;

a note name acquiring step of extracting note names of root notes of the chords acquired in the chord information acquiring step; and an arranged accompaniment generating step of generating an arranged accompaniment part for sound production of sounds of pitches corresponding to the note names acquired in the note name acquiring step in a pitch range that is a predetermined range of pitches at the sound production timings of the chords, which are acquired in the chord information acquiring step, corresponding to the sounds, wherein, in the arranged data generating step, the arranged data is generated on a basis of the melody part generated in the arranged melody generating step and the accompaniment part generated in the arranged accompaniment generating step.

8. The non-transitory computer-readable storage medium stored with the automatic music arrangement program according to claim 7, wherein the arranged accompaniment generating step includes:

a range changing step of changing a position in a pitch of the pitch range by one semitone each time;

a candidate accompaniment generating step of generating candidate accompaniment parts that are candidates for an accompaniment part from sounds of pitches corresponding to the note names which are acquired in the note name acquiring step in the pitch range, and the sound production timings of the chords which are acquired in the chord information acquiring step corresponding to the sounds, for each pitch range changed in the range changing step; and a selection step of selecting the arranged accompaniment part among the candidate accompaniment parts on a basis of the pitches of the sounds included in the candidate accompaniment parts generated in the candidate accompaniment generating step, wherein, in the arranged data generating step, the arranged data is generated on a basis of the accompaniment part selected in the selection step.

9. The non-transitory computer-readable storage medium stored with the automatic music arrangement program according to claim 8, wherein the pitch range is a range of pitches corresponding to one octave.

10. The non-transitory computer-readable storage medium stored with the automatic music arrangement program according to claim 8, wherein in the selection step, one of the candidate accompaniment parts generated in the candidate accompaniment generating step for which a standard deviation of differences between pitches of sounds included in the candidate accompaniment part and sounds of the melody part that are produced at the same time with the sounds is small is selected as the arranged accompaniment part.

11. The non-transitory computer-readable storage medium stored with the automatic music arrangement program according to claim 8, wherein in the selection step, one of the candidate accompaniment parts generated in the candidate accompaniment generating step for which a difference in pitches between a sound included in the candidate accompaniment part and a sound of a specific pitch is small is selected as the arranged accompaniment part.

12. The non-transitory computer-readable storage medium stored with the automatic music arrangement program according to claim 8, wherein in the selection step, one of the candidate accompaniment parts generated in the candidate accompaniment generating step for which a difference in pitches between a sound of a highest pitch and a sound of a lowest pitch included in the candidate accompaniment part is small is selected as the arranged accompaniment part.

13. The non-transitory computer-readable storage medium stored with the automatic music arrangement program according to claim 8, wherein in the note name acquiring step, in a case in which a chord acquired in the chord information acquiring step is a fraction chord, a note name of a denominator side of the fraction chord is acquired.

14. A non-transitory computer-readable storage medium stored with an automatic music arrangement program, causing a computer to execute a process of music arrangement of a musical piece data, the automatic music arrangement program causing the computer to execute:

a musical piece acquiring step of acquiring the musical piece data by accessing a memory, wherein the musical piece data has a data structure that stores chords and sound production timing corresponding to each of the chords;

a chord information acquiring step of extracting the chords and the sound production timings of the chords from the musical piece data acquired in the musical piece acquiring step;

a note name acquiring step of acquiring note names of root notes of the chords acquired in the chord information acquiring step;

a range changing step of changing a position in a pitch of a pitch range that is a predetermined range of pitches by one semitone each time;

a candidate accompaniment generating step of generating, for each pitch range changed in the range changing step, candidate accompaniment parts that are candidates for an accompaniment part from sounds of pitches corresponding to the note names which are acquired in the note name acquiring step in the pitch range, and the sound production timings of the chords which are acquired in the chord information acquiring step corresponding to the sounds;

a selection step of selecting an arranged accompaniment part among the candidate accompaniment parts on a basis of the pitches of sounds included in the candidate accompaniment parts generated in the candidate accompaniment generating step;

an arranged data generating step of generating an arranged data on a basis of the accompaniment part selected in the selection step; and an arranged data displaying step of displaying a simplified musical score having fewer chord with respect to a musical score corresponding to the musical piece data based on the arranged data on a display.

15. The non-transitory computer-readable storage medium stored with the automatic music arrangement program according to claim 14 wherein the pitch range is a range of pitches corresponding to one octave.

16. The non-transitory computer-readable storage medium stored with the automatic music arrangement program according to claim 14, wherein in the selection step, one of the candidate accompaniment parts generated in the candidate accompaniment generating step for which a standard deviation of differences between pitches of sounds included in the candidate accompaniment part and sounds of the melody part that are produced at the same time with the sounds is small is selected as the arranged accompaniment part.

17. The non-transitory computer-readable storage medium stored with the automatic music arrangement program according to claim 14, wherein in the selection step, one of the candidate accompaniment parts generated in the candidate accompaniment generating step for which a difference in pitches between a sound included in the candidate accompaniment part and a sound of a specific pitch is small is selected as the arranged accompaniment part.

18. The non-transitory computer-readable storage medium stored with the automatic music arrangement program according to claim 14, wherein in the selection step, one of the candidate accompaniment parts generated in the candidate accompaniment generating step for which a difference in pitches between a sound of a highest pitch and a sound of a lowest pitch included in the candidate accompaniment part is small is selected as the arranged accompaniment part.

19. The non-transitory computer-readable storage medium stored with the automatic music arrangement program according to claim 14, wherein in the note name acquiring step, in a case in which a chord acquired in the chord information acquiring step is a fraction chord, a note name of a denominator side of the fraction chord is acquired.

20. An automatic music arrangement device, comprising:

a display;

a memory; and a hardware processor, configured to:

access the memory to acquire a musical piece data including a melody part, wherein the musical piece data has a data structure that stores a plurality of musical notes, a start time corresponding to each musical note, a sound production period corresponding to each musical note, and a pitch corresponding to each musical note;

extract, from the musical piece data, the plurality of musical notes of the melody part and the start time, the sound production period and the pitch corresponding to each of the musical notes;

identify one of a plurality of first musical note having a highest pitch among the first musical notes, among the musical notes extracted from the melody part, as an outer voice note based on the start time of the first musical notes extracted from the data structure of the musical piece data, wherein the start times of the first and second musical notes are approximately the same;

identify a second musical note of which sound production starts within the sound production period of the outer voice note and of which the pitch is lower than that of the outer voice note as an inner voice note, among the musical notes based on the pitch and sound production period corresponding to the first and second musical notes extracted from the data structure of the musical piece data;

generate an arranged melody part by deleting the inner voice note from the musical notes extracted from the melody part of the musical piece data; and generate an arranged data based on the arranged melody part; and display a simplified musical score having fewer musical notes with respect to a musical score corresponding to the musical piece data based on the arranged data on the display.

21. An automatic music arrangement device, comprising:

a display;

a memory; and a hardware processor, configured to:

access the memory to acquire a musical piece data, wherein the musical piece data has a data structure that stores chords and sound production timing corresponding to each of the chords;

extract the chords and the sound production timings of the chords from the musical piece data acquired by the musical piece acquiring portion;

acquire note names of root notes of the chords acquired by the chord information acquiring portion;

change a position in a pitch of a pitch range that is a predetermined range of pitches by one semitone each time;

generate, for each pitch range changed by the range changing portion, candidate accompaniment parts that are candidates for an accompaniment part from sounds of pitches corresponding to the note names which are acquired by the note name acquiring portion in the pitch range, and the sound production timings of the chords which are acquired by the chord information acquiring portion corresponding to the sounds;

select an arranged accompaniment part among the candidate accompaniment parts on a basis of the pitches of sounds included in the candidate accompaniment parts generated by the candidate accompaniment generating portion;

generate arranged data on a basis of the accompaniment part selected by the selection portion;

displaying a simplified musical score having fewer chord with respect to a musical score corresponding to the musical piece data based on the arranged data on a display.

* * * * *